US010390202B2

(12) United States Patent
Lihosit et al.

(10) Patent No.: US 10,390,202 B2
(45) Date of Patent: Aug. 20, 2019

(54) CONTROL BEACONS FOR WIRELESS DEVICES

(71) Applicant: T-Mobile U.S.A., Inc., Bellevue, WA (US)

(72) Inventors: Christopher Lihosit, Seattle, WA (US); Tyler Axdorff, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/027,245

(22) Filed: Jul. 3, 2018

(65) Prior Publication Data

US 2018/0317074 A1    Nov. 1, 2018

Related U.S. Application Data

(62) Division of application No. 15/393,088, filed on Dec. 28, 2016, now Pat. No. 10,063,995.

(60) Provisional application No. 62/271,891, filed on Dec. 28, 2015.

(51) Int. Cl.
| | |
|---|---|
| *H04B 7/00* | (2006.01) |
| *H04W 4/80* | (2018.01) |
| *H04W 40/24* | (2009.01) |
| *H04W 4/04* | (2009.01) |
| *H04W 4/33* | (2018.01) |
| *H04W 48/04* | (2009.01) |
| *H04W 48/12* | (2009.01) |

(52) U.S. Cl.
CPC ............. *H04W 4/80* (2018.02); *H04W 4/043* (2013.01); *H04W 4/33* (2018.02); *H04W 40/244* (2013.01); *H04W 48/04* (2013.01); *H04W 48/12* (2013.01)

(58) Field of Classification Search
CPC ....... H04W 4/80; H04W 40/244; H04W 4/33; H04W 4/043; H04W 48/12; H04W 48/04
See application file for complete search history.

(56) References Cited

U.S. PATENT DOCUMENTS

| | | | |
|---|---|---|---|
| 10,063,995 B2 | 8/2018 | Lihosit et al. | |
| 2009/0282130 A1 | 11/2009 | Antoniou et al. | |
| 2010/0124196 A1 | 5/2010 | Bonar et al. | |
| 2010/0201536 A1 | 8/2010 | Robertson et al. | |
| 2014/0370863 A1 | 12/2014 | Proctor, Jr. et al. | |
| 2015/0079942 A1* | 3/2015 | Kostka | H04W 4/21 455/411 |
| 2015/0140982 A1* | 5/2015 | Postrel | H04W 4/12 455/418 |
| 2016/0125467 A1* | 5/2016 | Scott | H04W 4/043 705/14.58 |

* cited by examiner

*Primary Examiner* — Nhan T Le (57) ABSTRACT

Systems and methods for automatically modifying computing devices are provided. Various embodiments allow multiple control beacons (e.g., Bluetooth low energy beacons) with GPS to automatically pre-configure by discovering each other using location provided by the GPS in the beacons. These beacons can then be used to enforce multiple rules or policies on the computing device (e.g., restrict the activities/functionality of a mobile device). For example, a beacon can be installed at a family's dinner table and can be used as a trigger to restrict (or activate) phone features (e.g., allow only incoming calls while near this beacon during dinner times). In some embodiments, the GPS on the beacon can be used to notify administrators (e.g., parents) if the beacon is moved from its current location.

20 Claims, 7 Drawing Sheets

CONTROL BEACONS FOR WIRELESS DEVICES

CROSS-REFERENCES TO RELATED APPLICATIONS

This application is a division of U.S. patent application Ser. No. 15/393,088 filed Dec. 28, 2016, which claims the benefit of U.S. Provisional Application Ser. No. 62/271,891, filed on Dec. 28, 2015, and entitled "CONTROL BEACONS FOR WIRELESS DEVICES," both of which are hereby incorporated herein in their entireties by reference.

BACKGROUND

Modern mobile electronic devices (such as mobile phones, personal digital assistants, computer tablets, or the like) have become a common part of modern life. These devices increasingly provide advanced computing capabilities along with a variety of other features and options that improve the user's experience with the device. Some common examples of the features and options include cameras, Wi-Fi, SMS and MMS messaging, web browsers, voice/video calling, image and video capturing, and GPS capabilities. In addition to these common features and options, modern electronic devices often include operating systems that can run software applications on one or more processors. The software applications can be installed (e.g., by the manufacture, mobile carrier, or by the user) on these devices to perform a variety of specific tasks and/or extend the functionality of the devices.

The software applications may use many of the hardware and other software components of the mobile devices. As the demands and functionality of the software applications increase, so does the frequency of use for these components including situations where such use may not be desired. Not only are the demands and functionality increasing, but the mobile devices are becoming smaller and the features and applications are becoming more powerful. As such, the devices can be used in a variety of ways which may not be desired by those that do not own or operate the device or based on the context or location in which the device is located. Unfortunately, there are few options for restricting the functionality of the device. It is with respect to these and other problems that embodiments of the present invention have been made.

BRIEF DESCRIPTION OF THE DRAWINGS

Embodiments of the present technology will be described and explained through the use of the accompanying drawings in which.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Various embodiments generally relate to the automatic restriction, disabling or enabling of mobile device hardware and software features. More specifically, some embodiments allow control beacons to send signals that can be used to modify (e.g., restrict, disable or enable) hardware and/or software features of the mobile device. In accordance with some embodiments, the mobile device modification may last as long as the device is within range of the control beacon. As such, once the device can no longer detect the control beacon, the one or more device modifications may end. In other embodiments, the modifications may be associated with various rules that govern the modifications of the mobile device.

One of the problems with traditional beacons is that one has to setup the beacons and tell software responding to beacon signals where the beacons are located. In contrast, embodiments described in detail below allow multiple control beacons (e.g., Bluetooth low energy beacons) with GPS capabilities to automatically pre-configure themselves by discovering each other using location provided by the GPS capabilities of the beacons. As such, control polices may be automatically associated with nearby beacons. A beacon, or network of beacons, can then be used to send signals, which when received by mobile devices, cause those devices to enforce multiple rules or policies on the devices (e.g., restrict the activities of a mobile device). For example, a control beacon can be installed at a family's dinner table and can be used as a trigger to restrict certain phone features (e.g., only incoming calls are accepted while near this beacon during dinner times). In some embodiments, the GPS capabilities of the beacon can be used to notify administrators (e.g., parents) if the beacon is moved from its current location.

In the following description, for the purposes of explanation, numerous specific details are set forth in order to provide a thorough understanding of embodiments of the present technology. It will be apparent, however, to one skilled in the art that embodiments of the present technology may be practiced without some of these specific details. While, for convenience, embodiments of the present technology are described with reference to modifying device functionality, embodiments of the present technology are equally applicable to customizing aesthetic and functional features/content (e.g., wallpaper, color schemes, sound schemes, applications, videos, etc.) on a mobile device.

The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

Figure 1:
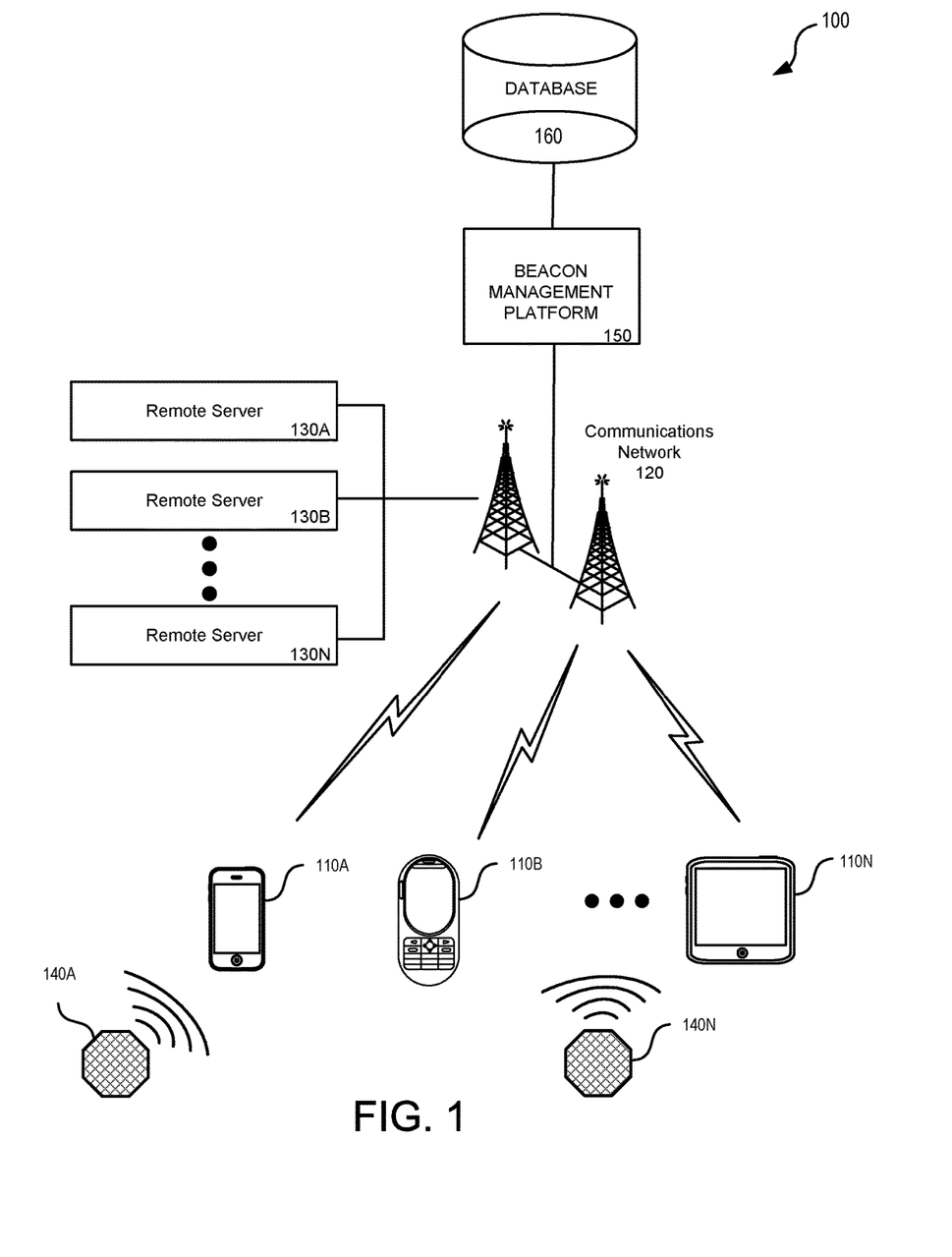
FIG. 1 illustrates an example of a communications environment in which some embodiments of the present technology may be utilized.

FIG. 1 illustrates an example of a communications environment 100 in which some embodiments of the present technology may be utilized. As illustrated in FIG. 1, communications environment 100 may include one or more mobile devices 110A-110N (such as a mobile phone, tablet computer, mobile media device, mobile gaming device, vehicle-based computer, wearable computing device, etc.), communications network 120, remote servers 130A-130N, control beacons 140A-140N, beacon management platform 150 and database 160. As described in more detail below in FIG. 2, to allow a user to make use of the various services and features of the mobile device, mobile devices 110A-110N can include various sensors and input/output components.

In addition, mobile devices 110A-110N can include network communication components that enable the mobile devices to communicate with remote servers 130A-130N or other portable electronic devices by transmitting and receiving wireless signals using licensed, semi-licensed or unlicensed spectrum over communications network 120. In some cases, communication network 120 may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. Communications network 120 can also include third-party communications networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network), or other communications network.

Those skilled in the art will appreciate that various other components (not shown) may be included in mobile device 110A-110N to enable network communication. For example, a mobile device may be configured to communicate over a GSM or newer mobile telecommunications network. As a result, the mobile device may include a Subscriber Identity Module (SIM) card that stores an International Mobile Subscriber Identity (IMSI) number that is used to identify the mobile device on the GSM mobile or other communications networks, for example, those employing 3G and/or 4G wireless protocols. If the mobile device is configured to communicate over another communications network, the mobile device may include other components that enable it to be identified on the other communications networks.

In some embodiments, mobile devices 110A-110N may include components that enable them to connect to a communications network using Generic Access Network (GAN), Unlicensed Mobile Access (UMA), or LTE-U standards and protocols. For example, a mobile device may include components that support Internet Protocol (IP)-based communication over a Wireless Local Area Network (WLAN) and components that enable communication with the telecommunications network over the IP-based WLAN. Further, while not shown, the mobile devices may include capabilities for permitting communications with satellites. Mobile devices 110A-110N may include one or more mobile applications that need to transfer data or check-in with remote servers 130A-130N.

Control beacons 140A-140N can be placed in a variety of locations. For example, these beacons may be placed within businesses, family residences, churches, museums, shrines, automobiles or other vehicles, etc. Each control beacon is able to transmit an identifier (e.g., using Bluetooth low energy or other wireless personal area network technology/protocols) which can be detected by mobile devices 110A-110N. The identifiers may or may not be unique. In addition, the identifiers may change over time in some embodiments. Software running on mobile devices 110A-110N may keep selected communications channels (e.g., Bluetooth low energy) active and prevent the user from manually disabling selected communications channels to prevent communication with the control beacon.

Once detected by the mobile devices, the device determines which hardware/software functionality to enable, disable, restrict or alter (collectively "modify"). In at least one embodiment, the device modification may be time based. As such, the features modified may only occur during specific days/times. For example, a family may setup a policy with a control beacon near a dinner table that during dinner time (e.g., 5-7 pm) on weekdays, a mobile device within range of that control beacon may only be used for emergency calls. As a result, text messaging and social network applications may be completely disabled at this location during the established time-based restrictions. As another example, control beacons may be placed near an entry ways of a building. Upon the mobile device detecting the control beacon near the entry way, the modifications may be set and persist until the mobile device exits the building or other area such as a parking lot. This has a clear economic advantage as fewer control beacons are needed to manage devices within the building.

In some embodiments, the identifier of the detected control beacon may be used to access a locally stored set of policies on the mobile device. If no match is found, the mobile device may then attempt to access beacon management platform 150 to retrieve associated modification policies. In other embodiments, the identifiers or data from the signal sent by the beacons may include a portion that the mobile device can use to directly interpret or determine the control policy. This may include a preset sequence that the mobile device can parse into multiple fields where a first value allows/enables a feature and a second value disables the feature.

In other embodiments, the value of the preset sequence itself (or portions thereof) may determine which features (hardware or software) to enable/disable. The preset sequence, in some embodiments, may be an alphanumeric sequence that includes numbers, letters, and/or symbols. For example, the following table illustrates some possible examples of preset sequences and their corresponding feature modification:

| Sequence | Feature Modification |
| --- | --- |
| 0001 | Disable Camera and Microphone |
| 0001a | Disable Microphone |
| 0001b | Disable Camera |
| 0002 | Enable Custom Applications |
| EMER | Only allow outgoing emergency calls |

In other embodiments, the sequence may have preset fields that allow an application on the mobile device to interpret the desired modification by parsing the sequence. The following set of fields illustrates the idea:

| Beacon ID | Camera | Microphone | Cellular Service | Sounds | Social Apps | Gaming Apps |
| --- | --- | --- | --- | --- | --- | --- |

The sequence in each of the non-identifier fields may be binary (i.e., 1-on or 0-off) or include more options. As such, a control signal having a 4 digit beacon ID, that reads the following 12345000111 can be parsed and interpreted as follows: 12345—control beacon ID; 0—camera off; 0—microphone off; 0—cellular service off; 1—sounds on; 1 social apps on; and 1—gaming apps on. As such, various software applications, hardware, and device configurations can be controlled, such as a particular sequence used by the mobile device to disable social networking functionality. In addition, all or part of the identifier may automatically change over time (e.g., hours, days, etc.) so that the enabled/disabled features of the device change accordingly. In other embodiments, a hashing function that changes over time may be applied to the identifier to determine the modifications to apply.

Figure 2:
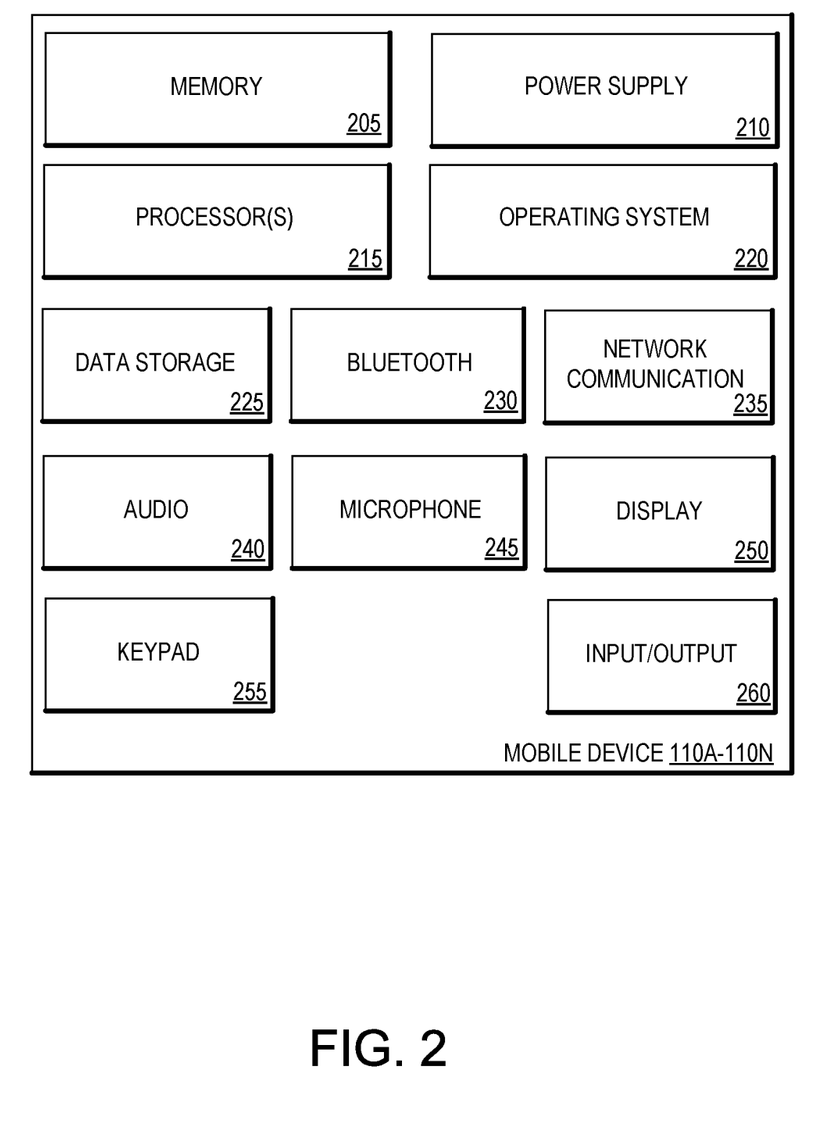
FIG. 2 illustrates a set of components within a mobile device according to one or more embodiments of the present technology.

FIG. 2 illustrates a set of components within mobile device 110A-110N according to one or more embodiments of the present technology. As shown in FIG. 2, mobile device 110A-110N may include memory 205 (e.g., volatile memory and/or nonvolatile memory), power supply 210 (e.g., battery), processor(s) 215 for executing processing instructions, and operating system 220. Additional components such as data storage component 225 (e.g., hard drive, flash memory, memory card, etc.), one or more network interfaces (e.g., Bluetooth Interface 230; and Network Communication Interface 235, which enables the mobile phone to communicate by transmitting and receiving wireless signals using licensed, semi-licensed or unlicensed spectrum over a telecommunications network), audio interface 240, microphone 245, display 250, keypad or keyboard 255, and other input and/or output interfaces 260. The various components of a mobile device may be interconnected via a bus.

Processor(s) 215 are the main processors of mobile device 110A-110N which may include application processors, baseband processors, various coprocessors, and other dedicated processors for operating mobile device 110A-110N. For example, an application processor can provide the processing power to support software applications, memory management, graphics processing, and multimedia. An application processor may be communicably coupled with memory 205 and configured to run the operating system, the user interface, and the applications stored on memory 205 or data storage component 225. A baseband processor may be configured to perform signal processing and implement/manage real-time radio transmission operations of mobile device 110. These processors along with the other components may be powered by power supply 210. The volatile and nonvolatile memories found in various embodiments may include storage media for storing information such as processor-readable instructions, data structures, program modules, or other data. Some examples of information that may be stored include basic input/output systems (BIOS), operating systems, and applications.

Figure 3:
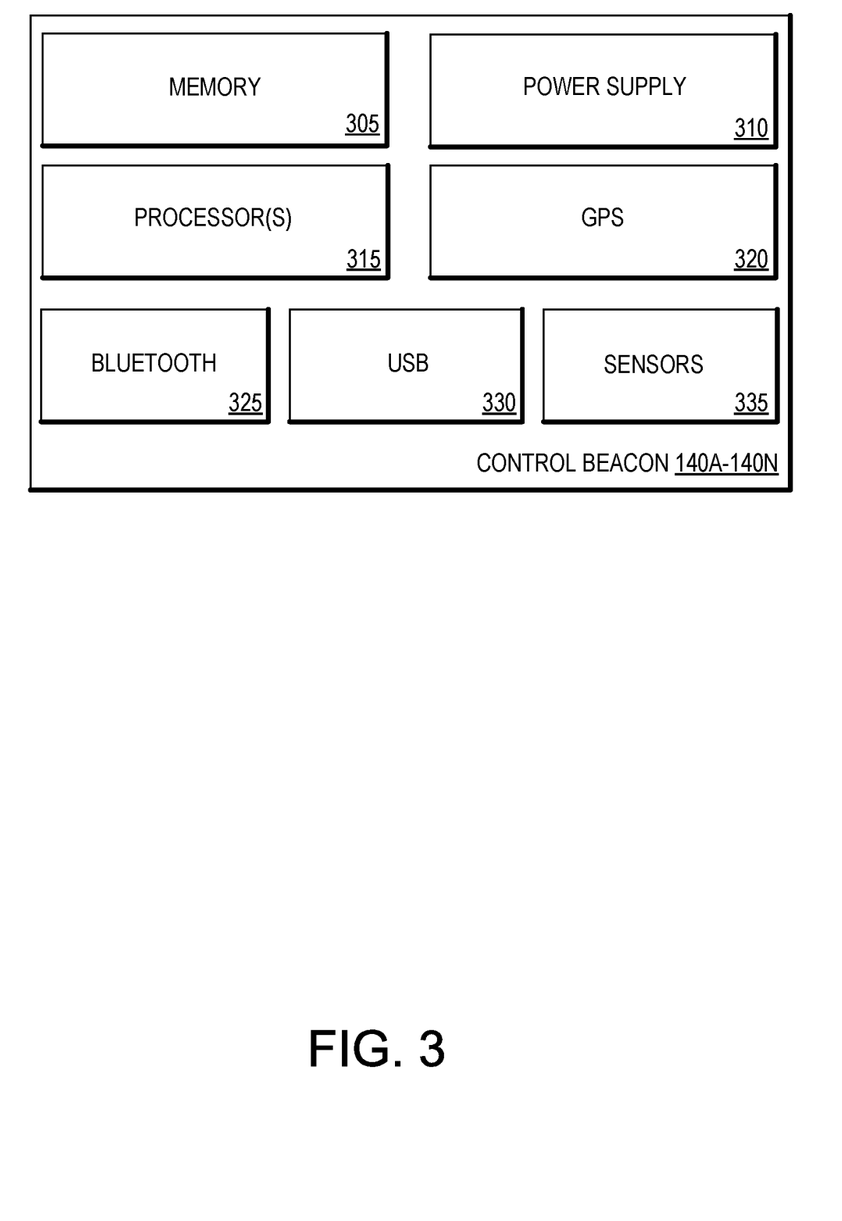
FIG. 3 illustrates a set of components within a control beacon according to various embodiments of the present technology.

FIG. 3 illustrates a set of components within control beacons 140A-140N according to one or more embodiments of the present technology. As shown in FIG. 3, control beacon 140A-140N may include memory 305 (e.g., volatile memory and/or nonvolatile memory), power supply 310 (e.g., battery, solar panel, etc.), and processor(s) 315 (or ASICs) for executing processing instructions. Additional components such as GPS 320, Bluetooth 325, USB 330 and/or additional sensors 335 (e.g., temperature sensors, motion sensors, accelerometers, light sensors, vibration sensors) may also be included in various embodiments of control beacon 140A-140N.

USB interface 330 can be used as an interface for configuring the control beacon. These may be used, for example, in a home application tier of beacons. Other embodiments of the control beacon may also have a wireless or wired interface for configuring the control beacon. This wired or wireless interface for configuring the control beacons may be on an enterprise tier of control beacons in some embodiments. The Bluetooth interface may allow for a variety of settings including a setting that allows the range of the broadcast control signal to be configured. These ranges may be available in preset increments (e.g., one foot, three feet, five feet and ten feet). These preset increments may be based on an estimated range computed from signal strength and environmental factors such as walls or other obstacles. In other embodiments, the range (or strength of the control signal) may be completely customizable from one foot or less to ten feet or more.

The processor and other components can be used to generate and transmit control signals (e.g., using Bluetooth Interface 325 or other personal area network hardware and protocols). Once received by the mobile device, specific hardware and/or software functionality of the mobile device can be modified. In accordance with various embodiments, sensors 335 can be used as additional inputs to change the control signal, generate notifications, power on/off the control beacon, add additional fields within the control signal, and the like. For example, if the control beacon has an accelerometer this could be used to generate a notification to an administrator that the control beacon has been moved. As another example, the accelerometer may be used to change the control signal itself such as if the control beacon is in an automobile the control signal can restrict all activity but GPS navigation and/or emergency calling when an acceleration is detected.

Sensors 335 may include a microphone to detect sound. In some embodiments, the signal generated by the microphone can be used to determine the noise level of the surrounding environment of the control beacon. Using this information the policies and/or range of the beacon may be dynamically set. As a result, when the noise level increases the policies may impose more restrictions on calling and sounds of the device or simply increase the range of those policies. Similarly, when the noise level decreases the range of the beacon may be reduced or the policies loosened so that more calls may occur.

In some embodiments, the control beacon uses Bluetooth component 325 or other communication component to receive an acknowledgement response, inquiry, challenge, or other message from the mobile device that is generated and transmitted in response to the detection of the control signal. For example, the control beacon may receive an identifier (e.g., device ID, International Mobile Subscriber Identity, user name and/or credentials, etc.) from the mobile device. The identifier can be stored within memory 305 of the control beacon and/or uploaded to a server (e.g., control beacon management platform 150 illustrated in FIG. 1). This creates a tracking feature of mobile devices that pass within range of the control beacon. Some embodiments allow for real-time or near real-time interfaces to this information for a variety of uses (e.g., serving advertisements, device monitoring, and the like).

Figure 4:
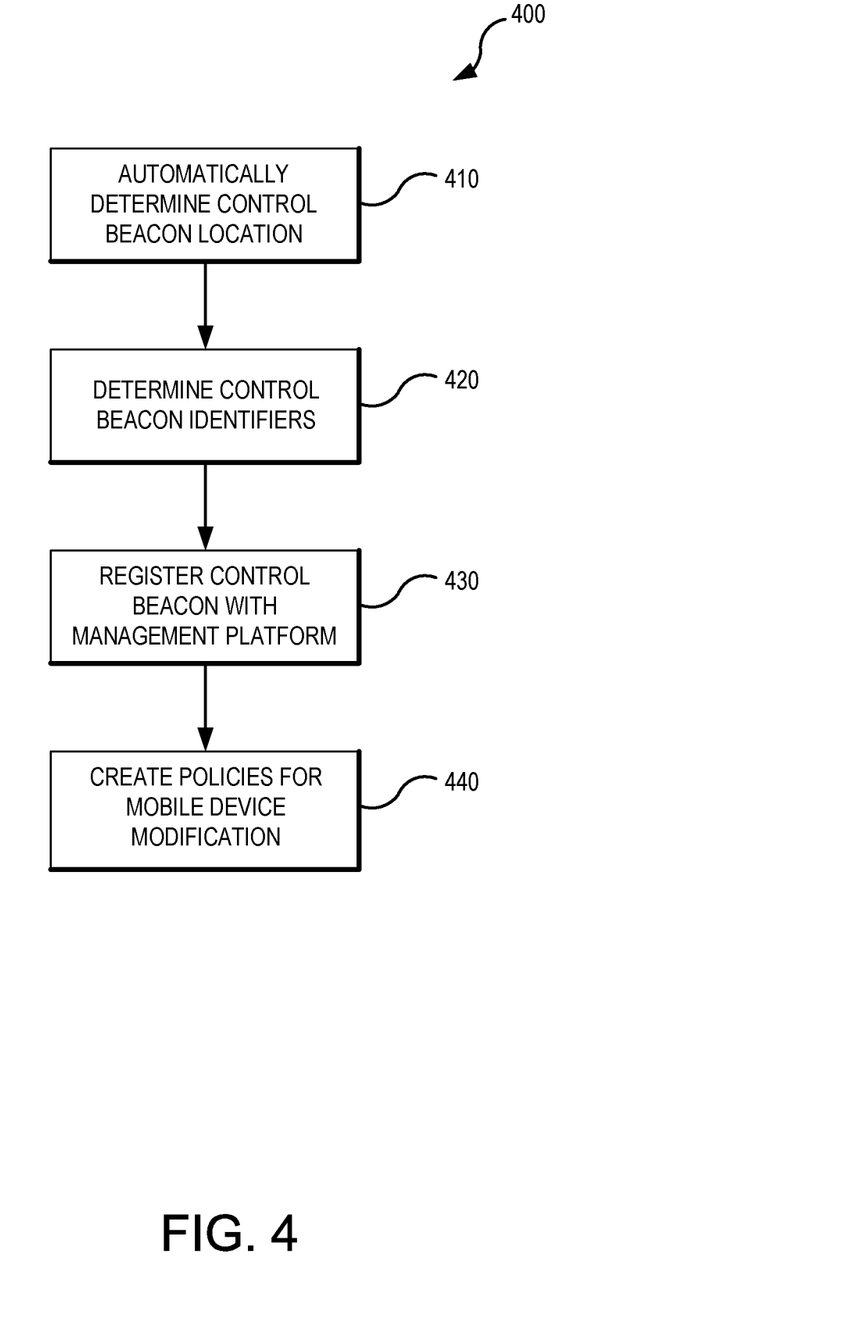
FIG. 4 is a flowchart illustrating a set of operations for automatically configuring a control beacon in accordance with some embodiments of the present technology.

FIG. 4 is a flowchart illustrating a set of operations for automatically configuring a control beacon in accordance with some embodiments of the present technology. As illustrated in FIG. 4, location operation 410 automatically determines the control beacon location. This determination can occur in a variety of ways. For example, the control beacon may be equipped with a GPS component. As such, the location may be determined directly from the GPS component. As another example, the control beacon may be able to detect another beacon nearby which has already been preconfigured or has a GPS component. Using the information from the other control beacon, the control beacon location can be automatically determined.

Identification operation 420 determines the control beacon identifiers. The identifiers may be set at the factory, or all or part of the identifiers may be customized by an administrator via a graphical user interface or other mechanism. The control beacon and associated policies may then be registered with a management platform during registration operation 430. In other embodiments, the policies may be directly loaded onto the control beacon (e.g., using a USB or wireless interface). Still yet, there may be tiers of control beacons some that require local management (e.g., via a USB) and some that require a management platform for setting the policies. During creation operation 440, policies for mobile device modification can be created.

Mobile devices 110A-110N can detect the control signals generated by the control beacon. The mobile application may have an installed application, dedicated hardware component, or an integrated operating system component that would trigger modifications to the mobile device hardware and/or software upon detection and processing of a detected control signal. In some embodiments, there may be a table (e.g., predefined in factory or set by admin/user) that includes a column of beacon IDs and corresponding rules to execute when that ID is received. Consequently, when the device detects ID 12345, the table says to shut down the WiFi radio and shut down cellular data so that only voice calls are possible, and when it detects ID 56789, then the input devices like camera app and microphone are disabled, etc.

The policies created during creation operation 440 may range from completely shutting down the device (e.g., in a restricted area) to allowing full unrestricted operations (e.g., in a public space). Some policies may be fixed to the type of beacon that is purchased. For example, some beacons can be coded so that mobile devices receiving their beacon signals always disable the camera on the mobile device. This type of fixed structure could be useful in areas where sensitive or restricted information is present and the user of the control beacon desires to prevent tampering or inadvertently adjusting policy settings.

Modifications associated with other beacons may be fully customizable. As an example, a beacon may be purchased and installed in a family residence near the dinner table. An administrator (e.g. a head of the household) may locate the beacon near the dinner table and set with one or more policies that restrict mobile device activity during meal times (e.g., breakfast, lunch, or dinner). When any mobile device is near (e.g., within five feet of) the dinner table, the mobile starts shutting off or suspending services (e.g. WiFi radio, certain device functionality, certain apps, etc.). For example, the modification implemented by the phone when detecting the particular beacon ID may be to receive only incoming calls. As such, no Facebook messages, no text messages, no Internet, no games, and the like may be allowed during meal times but allow full functionality (or a different set of restrictions) at other times or at locations out of range of the beacon. As another example, the mobile device may only be allowed to make calls to emergency services (e.g., 911).

The policies may also include excluded devices on which the policies should not be applied. For example, policies may be created individually on different mobile devices that indicate that all mobile devices, except device A, B, and C, can only make calls to emergency services. Device A may have a separate, different policy that allows it to receive and send text messages. Device B may have a policy similar to device A, but also be allowed to send and receive e-mails; device C may have a policy that allows it to also be able to access the Internet (e.g. via WiFi, cellular data, or both).

In addition to residential uses, control beacons and associated policies may be used in commercial settings or within vehicles (e.g., automobiles, planes, buses, trains, etc.). For example, the control policies created during creation operation 440 may indicate that no sounds are allowed during at all during movies within a movie theater or within a church and during a church service. As another example, a company may want to install propriety software that can only be used in a certain location. As such, the software will only be enabled upon detection of a control beacon within that location. The control policies may also be used to set network configurations. For example, a enforced virtual private network configurations may be set to allow applications on the mobile device to gain access to a shared repository or other resources on a private network. Such a local requirement feature may be useful in military, government, or other areas where maintaining secret and/or confidential information is essential. In some embodiments, the policies may allow for purchased or earned exclusions. As such, a user of a mobile device may be able to pay money in exchange for access to the services during the restriction.

For example, a business owner may disable, limit the duration of, limit the number of and/or otherwise restrict outgoing calls unless a fee is paid. Once the fee is paid, the mobile device may be excluded from such restrictions indefinitely or for a finite time period. As an example of an earned policy change, a coffee shop may disable one or more features of the mobile device until the mobile device has frequented the coffee shop more than a predetermined number of times within a fixed period (e.g., five times within the last thirty days). Once the policy change has been earned, an exclusion or change in the policy may be made for that mobile device.

In addition to fixed location based policies, dynamic policies may also be created during creation operation 440. For example, for a control beacon located within a car, a policy may be set that so that if the car is moving, all messaging, dialer functionality, video, and broadband functionality can be shut down and only GPS is left active for navigation. When the car is not moving, all functionality may be enabled. As such, the dynamic policy may depend on an input from one or more sensors or applications.

In some embodiments, the mobile devices may be set at the factory with a set of pre-installed policies that allow for the enforcement of certain rules such as a rule for a camera and/or microphone shutoff, a rule that shuts off all incoming services, a rule that the shuts down all audio output (silence), and a rule that shuts everything down except the ability to make 911 calls. This type of pre-installed policies can allow for universal enforcement of the most common or desirable policies.

Figure 5:
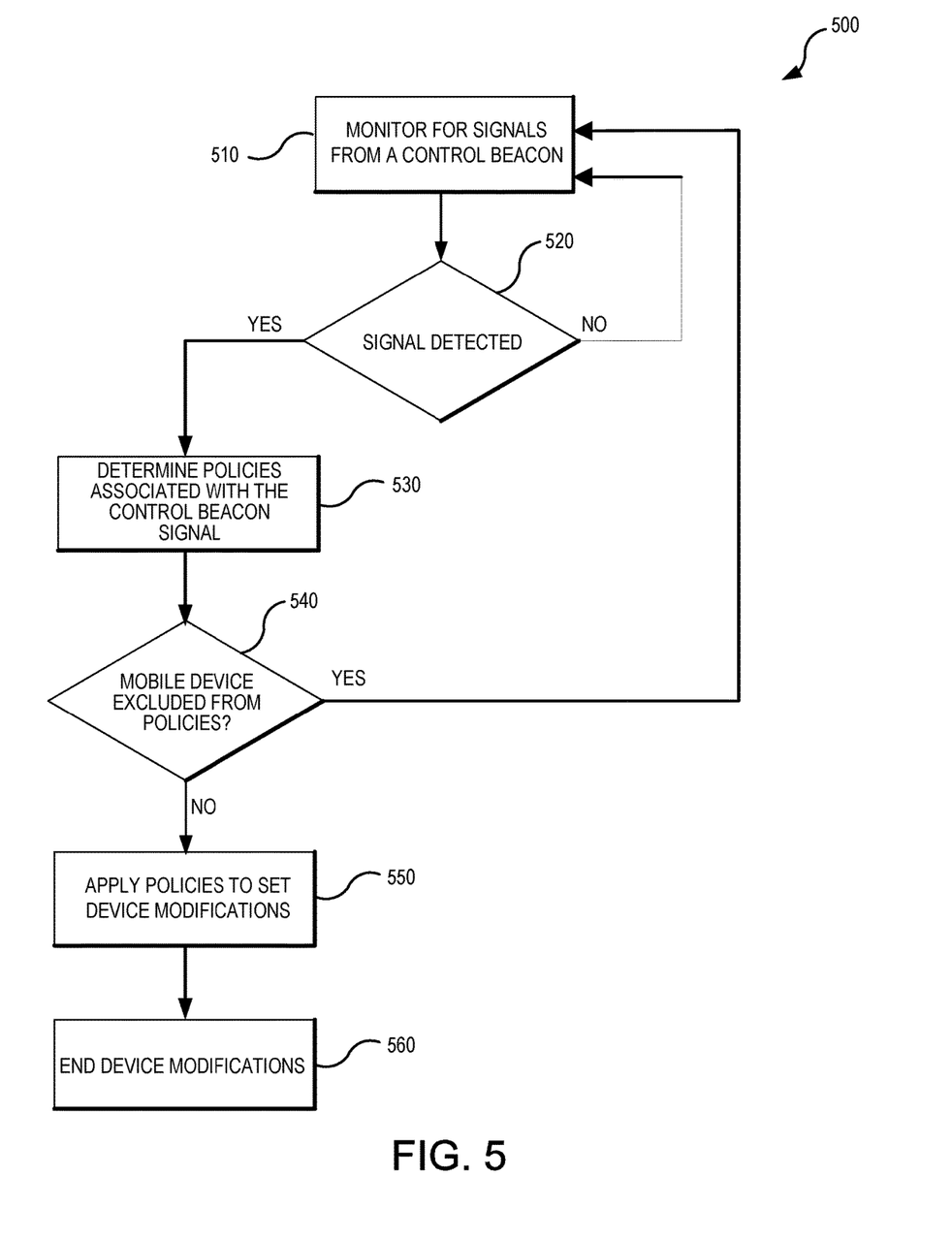
FIG. 5 is flowchart illustrating a set of operations for modifying a device in accordance with one or more embodiments of the present technology.

FIG. 5 is flowchart illustrating a set of operations 500 for modifying a device in accordance with one or more embodiments of the present technology. In the embodiments illustrated in FIG. 5, monitoring operation 510 monitors for signals from one or more control beacons. During detection operation 520 a determination is made as to whether one or more control signals have been detected. If no signal has been detected, then detection operation 520 branches to monitoring operation 510. If detection operation 520 determines that a signal has been detected, then detection operation 520 branches to policy determination operation 530 where the policies associated with the control beacon are determined. In some embodiments, the beacons may be prioritized so that any conflicting commands may be sorted and enforced based on priority level.

Policy determination operation 530 can determine the policies in a variety of ways. For example, the policy may be able to be directly determined from a signal received from the control beacon. As another example, multiple policies may be locally stored on the mobile device and the signal may be used as an index into those policies. Still yet, the mobile device may contact a beacon management platform (see, e.g., 150 in FIG. 1) to retrieve the policies. As one example, the beacons may be cascaded through a desired area. The initial beacon on an outer perimeter may require that a set of policies be loaded onto a mobile device. Then, upon detection of a control beacon within the perimeter an indicated policy may be retrieved from local memory or storage associated with the mobile device. If for some reason the policy is not able to be locally accessed then a secondary policy may require the most stringent enforcement (e.g., the mobile device may be required to completely shut down).

Once the policies are determined, modification or exclusion operation 540 determines if the mobile device is excluded. If exclusion operation 540 determines the mobile device is excluded, then exclusion operation 540 may branch to monitoring operation 510. If exclusion operation 540 determines the mobile device is not excluded, then exclusion operation 540 branches to application operation 550 where the policies are applied to set the device modifications (e.g., disable the camera). Once the policies expire (e.g., based on time, location, sensor input, etc.) then ending operation 560 ends the device modifications.

Figure 6:
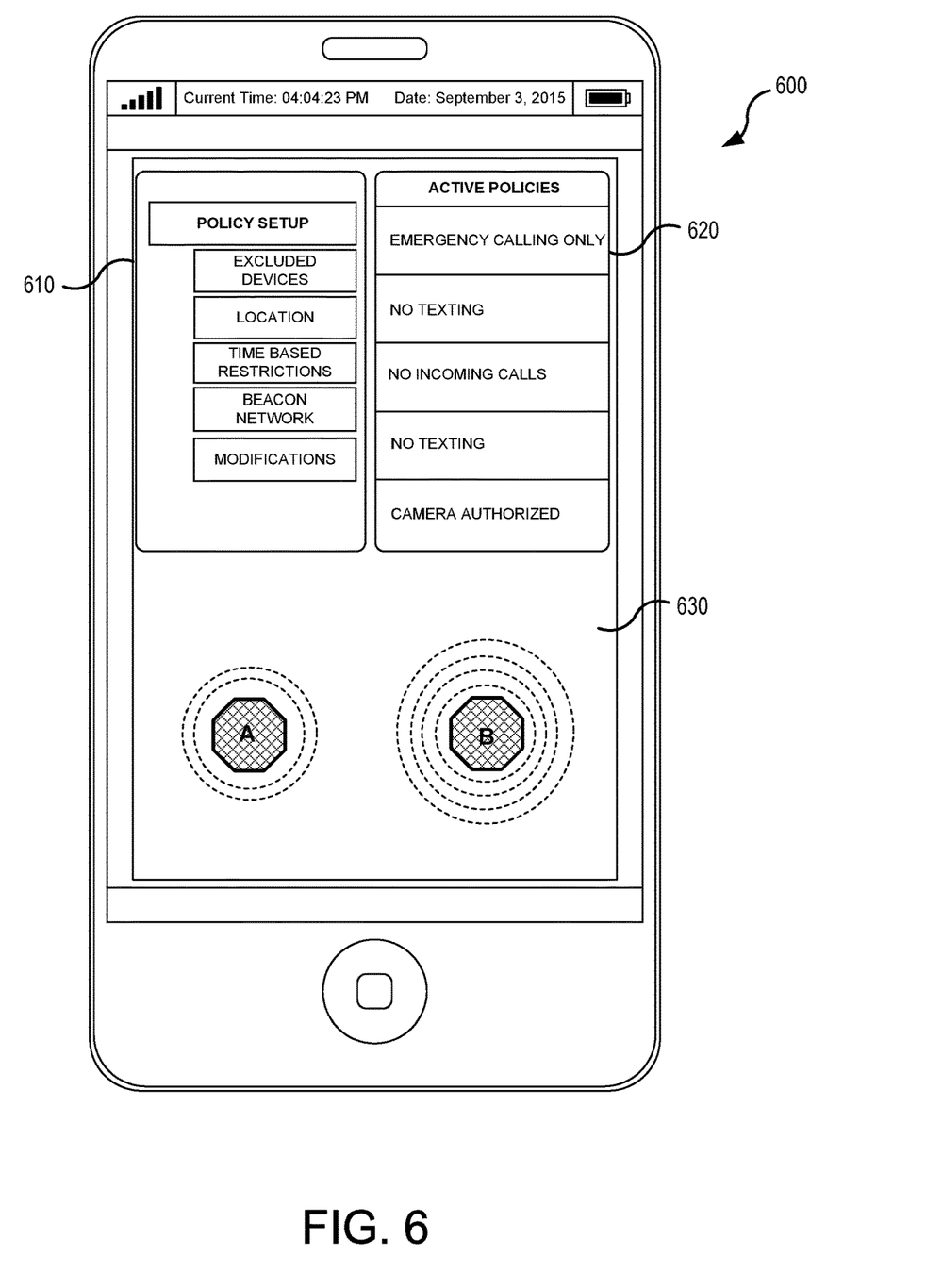
FIG. 6 is an example of a graphical user interface that may be used in accordance with some embodiments of the present technology.

FIG. 6 is an example of a graphical user interface 600 that may be used in accordance with some embodiments of the present technology to setup and configure a control beacon. The graphical user interface 600 may be automatically displayed when a control beacon is detected by a mobile device or other computing device running a specific setup software application. In other embodiments, the user of the mobile or computing device may navigate to a webpage or directly connect with the control beacon (e.g., via a wired or wireless interface).

The interface illustrated in FIG. 6 allows the user to setup various aspects of the policy by selecting beacon setup portion 610. Upon selection of beacon setup portion 610, the graphical user interface may display multiple interfaces for setting up different policy portions, such as excluding certain devices, setting the location of the beacon, setting time based restrictions, creating a beacon network, and setting modification policies that would allow for exclusions to be purchased, earned, or otherwise requested. In response to the setting set by the administrator, control signals may be generated (e.g., by populating fields with appropriate preset sequences that result in the desired policy enforcement). Once set, active policy portion 620 can display all policies currently set to allow for easy review by the administrator.

As discussed above, the location of the beacon may be automatically set (e.g., by using a GPS receiver within the beacon). The location of the control beacon can be useful if someone tries to relocate or move the control beacon. Through this interface the administrator can configure what response should occur. For example, the administrator may setup a notification (e.g., via e-mail) that indicates the beacon has been moved. The notification may identify any mobile devices that have sent a signal to the control beacon in response to detecting a control signal. As another example, alternate policies may be enforced or the policies associated with nearby beacons may be modified (e.g., all neighboring beacons cooperating to send the same signal to shut down all devices within range of any of the beacons).

Control beacon portion 630 may display neighboring control beacons and the range of the current control beacon settings. This visualization can be used by the administrator in reviewing coverage. In addition, control beacon portion 630 may allow the administrator to actively set the range with a drag and drop interface that responsively increases or decreases the range of each control beacon shown.

Figure 7:
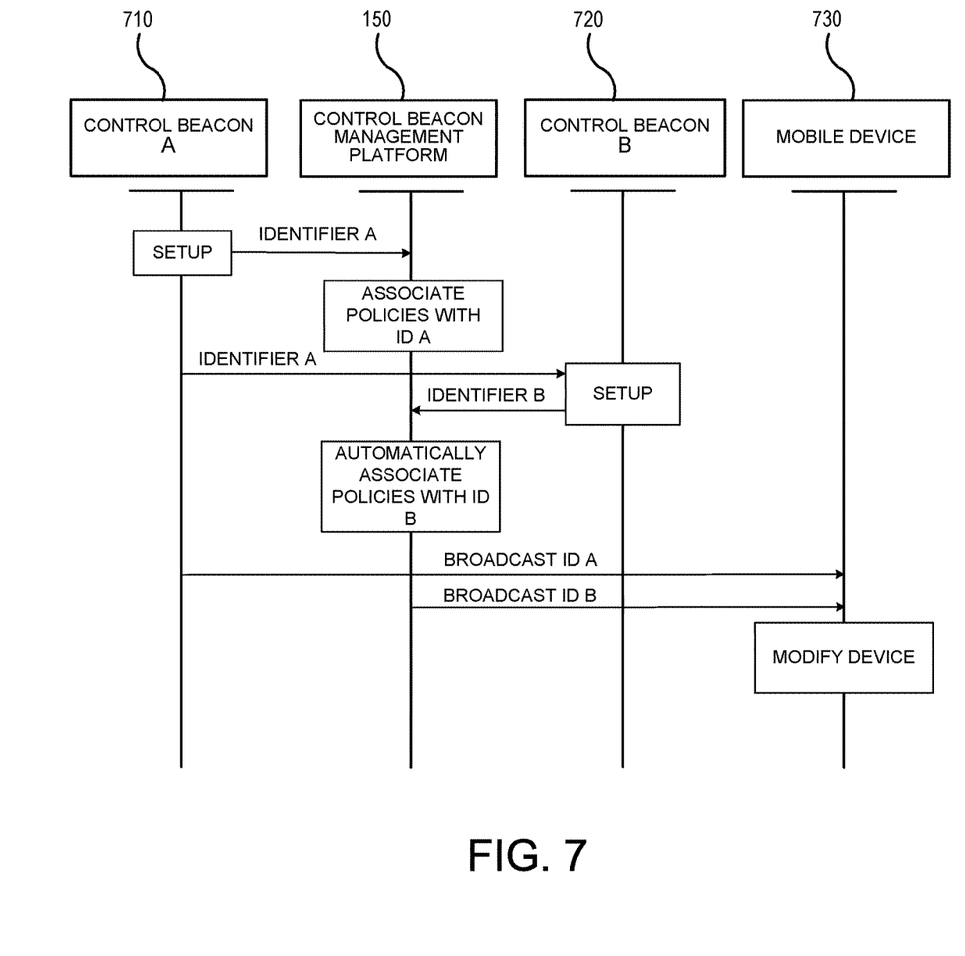
FIG. 7 is a sequence diagram illustrating an example of the data flow between various components of a communications according to various embodiments of the present technology.

FIG. 7 is a sequence diagram illustrating an example of the data flow between various components of a communications according to various embodiments of the present technology. As illustrated in FIG. 7, control beacon A 710 may be setup to broadcast identifier A. Using control beacon management platform 150, policies can be associated with identifier A. When control beacon B 720 initially detects identifier A, control beacon B 720 can automatically setup and transmit identifier B to control beacon management platform 150. Control beacon management platform 150 can automatically associate the policies of control beacon A 710 with control beacon B 720. As such, a network of identical beacons can be easily configured with only the setup of a single beacon. Once mobile device 730 detects any one of the broadcast identifiers, the device determines the associated policies and implements the corresponding modifications.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A mobile device comprising:
   at least one processor;
   at least one wireless transceiver coupled to the at least one processor;
   at least one memory, coupled to the at least one processor, and storing:
      an identification module configured to—
         receive a signal from a control beacon,
            wherein the signal from the control beacon comprises an identifier that uniquely identifies the control beacon among multiple control beacons, and
            wherein the identification module parses the identifier into at least a first field value and a second field value; and
         identify one or more policies in a set of policies to be applied in response to receipt of the signal from the control beacon,
            wherein at least one policy in the set of policies identifies aesthetic, content, hardware, or functional customizations to be applied to the mobile device; and
      a customization module configured to—
         apply the one or more policies on the mobile device while the identification module continues to receive the signal from the control beacon,
            wherein the customization module applies the one or more policies on the mobile device based on at least a portion of the identifier, the first field value, the second field value, or any combination thereof.

2. The mobile device of claim 1, wherein the functional customizations relate to a camera, a microphone, a network communication module, one or more sensors, speaker, an e-mail application, a gaming application, a social media application, a device connection, a network connection, or a cellular service associated with the mobile device.

3. The mobile device of claim 1, wherein the memory further stores at least one database, wherein the at least one database stores the set of policies.

4. The mobile device of claim 1, wherein one or more policies in the set of policies are automatically downloaded to the memory from a control beacon management platform.

5. The mobile device of claim 1,
   wherein the signal received by the mobile device from the control beacon comprises an identifier that uniquely identifies the control beacon among multiple control beacons, and
   wherein the identification module accesses one or more locally stored policies, stored at the mobile device, based on the identifier.

6. The mobile device of claim 1, wherein the identification module determines if the mobile device should be excluded from the identified one or more policies, and wherein when the identification module determines that the mobile device should be excluded, the customization module prevents the application of the one or more policies on the mobile device.

7. The mobile device of claim 1, wherein identification module recognizes a format of the signal from the control beacon and deciphers a customized portion that identifies the one or more policies that should be applied.

8. The mobile device of claim 1, wherein the one or more policies disable one or more of a camera, a microphone, incoming text messages, outgoing text messages, sounds, an ability to receive incoming calls, an ability to place outgoing calls, an e-mail application, a gaming application, a social media application, a device connection, a network connection, or a cellular service.

9. The mobile device of claim 1, wherein the identification module uses Bluetooth to detect the signal from the control beacon.

10. The mobile device of claim 1, wherein the customization module applies the one or more policies on the mobile device based on a time of day, location of the mobile device, or any combination thereof.

11. The mobile device of claim 1, wherein the memory further stores a transmission module configured to transmit a message to the control beacon in response to receipt of the signal from the control beacon, wherein the message comprises an identifier that uniquely identifies the mobile device among multiple mobile devices.

12. The mobile device of claim 1, wherein the identification module identifies the one or more policies based on a type of the control beacon.

13. A mobile device comprising:
at least one processor;
at least one wireless transceiver coupled to the at least one processor;
at least one memory, coupled to the at least one processor, and storing at least one database,
    wherein the at least one database stores multiple policies,
    wherein the policies identify aesthetic, content, hardware, or functional customizations to be applied to the mobile device, and
    wherein the memory further stores:
        an identification module configured to—
            receive a signal from a control beacon,
                wherein the signal from the control beacon comprises an identifier that uniquely identifies the control beacon among multiple control beacons; and
            identify one or more of the policies to be applied in response to receipt of the signal from the control beacon,
                wherein the identification module applies a hashing function on the identifier to identify the one or more policies to be applied in response to receipt of the signal from the control beacon; and
        a customization module configured to—
            apply the one or more policies on the mobile device while the identification module continues to receive the signal from the control beacon.

14. The mobile device of claim 13, wherein the policies are automatically downloaded to the memory from a control beacon management platform.

15. The mobile device of claim 13, wherein the identification module determines if the mobile device should be excluded from the one or more policies.

16. The mobile device of claim 13, wherein identification module recognizes a format of the signal from the control beacon and deciphers a customized portion that identifies the one or more policies that should be applied.

17. The mobile device of claim 13, wherein the one or more policies disable one or more of a camera, a microphone, incoming text messages, outgoing text messages, sounds, an ability to receive incoming calls, an ability to place outgoing calls, an e-mail application, a gaming application, a social media application, a device connection, a network connection, or a cellular service.

18. A non-transitory computer-readable medium storing instructions that when executed by one or more processors cause a mobile device to:
receive a signal from a control beacon,
    wherein the signal received from the control beacon is associated with one or more policies that modify a hardware or software functionality of the mobile device,
    wherein the signal from the control beacon comprises an identifier that uniquely identifies the control beacon among multiple control beacons, and
parse the identifier into at least a first field value and a second field value;
identify one or more of the policies to be applied in response to receipt of the signal from the control beacon;
determine, upon detection of the signal broadcast by the control beacon, whether the one or more policies should be applied to the machine until an ending event occurs; and
apply the one or more policies on the mobile device while the identification module continues to receive the signal from the control beacon,
    wherein the one or more policies are applied on the mobile device based on at least a portion of the identifier, the first field value, the second field value, or any combination thereof.

19. The non-transitory computer-readable medium of claim 18 further comprising instruction that when executed by the one or more processors cause the mobile device to:
determine if the mobile device should be excluded from the identified one or more policies; and
when it is determined that the mobile device should be excluded, preventing the application of the one or more policies on the mobile device.

20. The non-transitory computer-readable medium of claim 18 further comprising instruction that when executed by the one or more processors cause the mobile device to:
transmit a message to the control beacon in response to receipt of the signal from the control beacon, wherein the message comprises an identifier that uniquely identifies the mobile device among multiple mobile devices.

* * * * *